United States Patent
Bertin et al.

(10) Patent No.: US 6,462,129 B1
(45) Date of Patent: Oct. 8, 2002

(54) THERMOPLASTIC RESIN COMPOSITIONS COMPRISING A RIGID DISPERSED PHASE

(75) Inventors: Denis Bertin, Motteville; Alain Bouilloux, Bernay; Laurent Teze, Conflans Sainte-Honorine; Thierry Vivier, Serquigny, all of (FR)

(73) Assignee: Atofina, Puteaux (FR)

( * ) Notice: Subject to any disclaimer, the term of this patent is extended or adjusted under 35 U.S.C. 154(b) by 0 days.

(21) Appl. No.: 09/551,406

(22) Filed: Apr. 17, 2000

(30) Foreign Application Priority Data

Apr. 15, 1999 (FR) .............................. 99 04722

(51) Int. Cl.$^7$ .............................. C08F 291/00
(52) U.S. Cl. .............................. 525/56; 525/63; 525/70; 525/82; 525/86; 525/123; 525/165; 525/185; 525/191; 525/305
(58) Field of Search .............................. 525/305, 56, 63, 525/70, 82, 86, 123, 165, 185, 191

(56) References Cited

U.S. PATENT DOCUMENTS 3,992,486 A * 11/1976 Lang
4,000,216 A    12/1976 Lang
4,876,311 A    10/1989 Hennig et al.

FOREIGN PATENT DOCUMENTS

| | | |
|---|---|---|
| FR | 2 108 373 | 5/1972 |
| FR | 2 586 024 | 2/1987 |
| GB | 2 057 466 | 4/1981 |
| WO | 9746619 | 12/1997 |

* cited by examiner

Primary Examiner—Jeffrey Mullis
(74) Attorney, Agent, or Firm—Millen, White, Zelano & Branigan, P.C.

(57) ABSTRACT

The invention relates to a thermoplastic composition comprising: a matrix-forming thermoplastic polymer (M), rigid nodules obtained by radical polymerization, and optionally an impact modifier (S). It also relates to a process comprising, in a first stage, forming a homogeneous solution of precursor of the nodules in the thermoplastic (M) in the molten state, in a second stage, introducing the initiator while remaining at a temperature below which the initiator becomes active, and, in a third stage, heating to a temperature sufficient to cause crosslinking of the precursor and to form rigid nodules while kneading the composition, the impact modifier being introduced during the first or the second stage.

24 Claims, No Drawings

THERMOPLASTIC RESIN COMPOSITIONS COMPRISING A RIGID DISPERSED PHASE

FIELD OF THE INVENTION

The present invention relates to thermoplastic resin compositions comprising a rigid dispersed phase. The thermoplastics, such as, for example, polyamides or PMMA, should, depending on their uses, exhibit improved thermal behaviour.

BACKGROUND OF THE INVENTION

The prior art has provided several solutions for enhancing the thermomechanical properties of thermoplastic matrices.

One of the solutions is to introduce, into a thermoplastic matrix, another polymer (amorphous or crystalline) with higher thermal behaviour (higher glass transition temperature than that of the thermoplastic) than the matrix itself. The main materials based on these systems were mainly developed with, in particular, alloys (i) of polyphenylene oxides (PPO), of polyphenylene sulphides (PPS), of polyetherimides (PEI) or of polyketones with (ii) thermoplastic polymers, such as polyamides, polystyrenes, or ABS or SAN copolymers. U.S. Pat. Nos. 4,681,915, 4,600,741 and EP 244 090 have disclosed polyamides comprising PPO. The disadvantage of this technique is that it requires mixing the two polymers in the molten state under specific conditions and in machines, such as extruders or mixers, while correctly choosing the screw profile and the temperatures of the different zones. Furthermore, the polymer which is added to the thermoplastic matrix in order to reinforce it often has a high melting temperature.

Patent Application JP 04-149273 A, published on May 22, 1992, discloses polyamide or polypropylene alloys with a thermosetting resin capable of crosslinking at the melting temperature of the polyamide or of the polypropylene. This thermosetting resin is an epoxy. An increase in the HDT is found, in comparison with the polyamide or the polypropylene not comprising this epoxy resin. The term "HDT" (heat deflection temperature) denotes the temperature of deformation under load (the load and deformation values being conventionally defined); it is measured according to NF Standard T 51-005. This crosslinking takes place by polycondensation reactions which cause, during extrusion, the formation of nodules having a very broad range of sizes, which damages the other mechanical properties of the polyamide-epoxy or polypropylene-epoxy alloy, such as the impact strength. Furthermore, the polycondensation reaction can last for more than 10 minutes, which is incompatible with a continuous process, for example in an extruder.

SUMMARY OF THE INVENTION

The invention consists in introducing, into a thermoplastic matrix (polystyrene, poly(meth)acrylics, polyamides, polyolefins, elastomers, fluorinated polymers, and the like), hard nodules with a morphology (beads) and with a size (of the order of or less than a micron) which are controlled to a degree sufficient to allow the thermal behaviours of these thermoplastic polymers to be enhanced while retaining, indeed even improving, the initial mechanical properties (stiffness, impact) of the base matrix. The hard nodules of controlled morphology and size are obtained by radical polymerization of (di-, tri- or multi-) unsaturated monomers (polymerizing by this route). The compositions of the invention are thermoplastic.

The compositions of the invention also have the advantage of being able to be manufactured in a very simple way. This process, which consists in forming crosslinked (or rigid) nodules in situ within a thermoplastic matrix, exhibits several advantages. The first is that the starting mixture (thermoplastic matrix+precursor of the rigid nodules) is homogeneous: which amounts to saying that the precursor is miscible with the thermoplastic matrix in a given temperature range. This also improves the processability, since, during this first stage, there is in fact a plasticization of the matrix which is reflected by milder extrusion conditions. The second is related to the fact that the crosslinking precursors are generally miscible with the thermoplastic matrix even at a high content; high levels of dispersed phase (rigid nodules) can be obtained at the end. The other advantages relate to the morphology of the rigid nodules, since the stability is guaranteed because of the crosslinked nature of the dispersed phase and the fineness and the isotropy of the dispersion, which are due to the in situ formation of the dispersed phase.

Another advantage of the present invention relates to the impact strength. Numerous thermoplastics have to be modified by incorporation of elastomers or of polymers with a lower Tg (glass transition temperature). For example, polyamide-6 or polyamide-12 can comprise from 5 to 20% by weight of EPR (ethylene-propylene rubber or EPM) or of ethylene-alkyl acrylate-maleic anhydride copolymer. However, this introduction, while improving the impact strength, leads to a fall in the Vicat point and/or in the HDT. The term "Vicat point" is understood to mean the temperature at which a cylindrical rod with a cross section of 1 $mm^2$ sinks 1 mm into the sample. It is measured according to NF Standard T 51-021. It has been discovered that the presence of rigid nodules in a thermoplastic matrix was compatible with the presence of other polymers, such as impact modifiers, in this thermoplastic matrix. Furthermore, this thermoplastic, comprising the rigid nodules and the impact modifier, had a Vicat point and/or an HDT at least equal to that of the thermoplastic comprising neither rigid nodules nor impact modifier and the impact strength was better than that of the thermoplastic comprising only the impact modifier.

One aspect of the present invention is, therefore, a thermoplastic composition comprising:
- a matrix-forming thermoplastic polymer (M),
- rigid nodules obtained by radical polymerization,
- optionally an impact modifier (S).

The invention will now be described in detail.

Mention may be made, as examples of polymers (M), of polyolefins, polyamides, fluorinated polymers, saturated polyesters, polycarbonate, styrene resins, PMMA, thermoplastic polyurethanes (TPU), copolymers comprising polyamide blocks, copolymers comprising polyester blocks and polyether blocks, PVC, copolymers of ethylene and of vinyl alcohol (EVOH), and polyketones.

The term "polyamide" is understood to mean the condensation products:
of one or more amino acids, such as aminocaproic, 7-aminoheptanoic, 11-aminoundecanoic and 12-aminododecanoic acids, or of one or more lactams, such as caprolactam, oenantholactam and lauryllactam;
of one or more salts or mixtures of diamines, such as hexamethylenediamine, dodecamethylenediamine, meta-xylylenediamine, bis(p-aminocyclohexyl) methane and trimethylhexamethylenediamine, with diacids, such as isophthalic, terephthalic, adipic, azelaic, suberic, sebacic and dodecanedicarboxylic acids;

or of the mixtures of some of these monomers which results in copolyamides, for example PA-6/12 by condensation of caprolactam and lauryllactam.

The polymers comprising polyamide blocks and polyether blocks result from the copolycondensation of polyamide sequences comprising reactive ends with polyether sequences comprising reactive ends, such as, inter alia:

1) Polyamide sequences comprising diamine chain ends with polyoxyalkylene sequences comprising dicarboxyl chain ends.
2) Polyamide sequences comprising dicarboxyl chain ends with polyoxyalkylene sequences comprising diamine chain ends obtained by cyanoethylation and hydrogenation of aliphatic $\alpha,\omega$-dihydroxylated polyoxyalkylene sequences, known as polyetherdiols.
3) Polyamide sequences comprising dicarboxyl chain ends with polyetherdiols, the products obtained being, in this specific case, polyetheresteramides.

The polyamide sequences comprising dicarboxyl chain ends originate, for example, from the condensation of $\alpha,\omega$-aminocarboxylic acids, of lactams or of dicarboxylic acids and diamines in the presence of a chain-limiting dicarboxylic acid. The polyamide blocks are advantageously made of polyamide-12.

The number-average molar mass of the polyamide sequences is between 300 and 15,000 and preferably between 600 and 5000. The mass of the polyether sequences is between 100 and 6000 and preferably between 200 and 3000.

The polymers comprising polyamide blocks and polyether blocks can also comprise randomly distributed units. These polymers can be prepared by the simultaneous reaction of the polyether and of the precursors of the polyamide blocks.

For example, polyetherdiol, a lactam (or an $\alpha,\omega$-amino acid) and a chain-limiting diacid can be reacted in the presence of a small amount of water. A polymer is obtained which has essentially polyether blocks and polyamide blocks, the latter being of highly variable length, but also the various reactants which have reacted randomly, which are distributed statistically along the polymer chain.

These polymers comprising polyamide blocks and polyether blocks, whether they originate from the copolycondensation of polyamide and polyether sequences prepared beforehand or from a one-stage reaction, exhibit, for example, Shore D hardnesses which can be between 20 and 75 and advantageously between 30 and 70 and an intrinsic viscosity between 0.8 and 2.5, measured in meta-cresol at 25° C.

Whether the polyether blocks derive from polyethylene glycol, from polypropylene glycol or from polytetramethylene glycol, they are either used as is and copolycondensed with polyamide blocks comprising carboxyl ends or they are aminated, in order to be converted into polyetherdiamines, and condensed with polyamide blocks comprising carboxyl ends. They can also be mixed with polyamide precursors and a chain-limiting agent in order to prepare polymers comprising polyamide blocks and polyether blocks having statistically distributed units.

Polymers comprising polyamide and polyether blocks are disclosed in U.S. Pat. Nos. 4,331,786, 4,115,475, 4,195,015, 4,839,441, 4,864,014, 4,230,838 and 4,332,920.

The polyether can be, for example, a polyethylene glycol (PEG), a polypropylene glycol (PPG) or a polytetramethylene glycol (PTMG). The latter is also known as polytetrahydrofuran (PTHF).

Whether the polyether blocks are introduced into the chain of the polymer comprising polyamide blocks and polyether blocks in the form of diols or diamines, they are known for simplicity as PEG blocks or PPG blocks or PTMG blocks.

It would not be departing from the scope of the invention if the polyether blocks comprised units other than units derived from ethylene glycol, from propylene glycol or from tetramethylene glycol.

The polymer comprising polyamide blocks and polyether blocks is advantageously such that the polyamide is the major constituent by weight, that is to say that the amount of polyamide which is in the form of blocks and that which is optionally distributed statistically in the chain represents 50% by weight or more of the polymer comprising polyamide blocks and polyether blocks. The amount of polyamide and the amount of polyether are advantageously in the (polyamide/polyether) ratio 50/50 to 80/20.

The polyamide blocks and the polyether blocks of the same polymer (B) preferably have masses Mn of 1000/1000, 1300/650, 2000/1000, 2600/650 and 4000/1000 respectively.

The term "polyolefin" is understood to mean a polymer comprising olefin units, such as, for example, ethylene, propylene, 1-butene or any other $\alpha$-olefin units. Mention may be made, as examples, of:

polyethylenes, such as LDPE, HDPE, LLDPE or VLDPE, polypropylene, ethylene/propylene copolymers, PE metallocenes or ethylene/$C_3$ to $C_{10}$ monomers copolymers;

copolymers of ethylene with at least one product chosen from the salts or the esters of unsaturated carboxylic acids or the vinyl esters of saturated carboxylic acids.

The polyolefin is advantageously chosen from LLDPE, VLDPE, polypropylene, ethylene/vinyl acetate copolymers or ethylene/alkyl (meth)acrylate copolymers. The relative density can advantageously be between 0.86 and 0.965 and the melt flow index (MFI) can be between 0.3 and 40.

Mention may be made, as examples of fluorinated polymers, of poly(vinylidene fluoride) (PVDF), copolymers comprising vinylidene fluoride ($VF_2$), copolymers of ethylene and of tetrafluoroethylene, poly(trifluoroethylene), trifluoroethylene copolymers, hexafluoropropene homo- and copolymers, or chlorotrifluoroethylene homo- and copolymers. Use is advantageously made of PVDF.

The term "EVOH" is understood to mean copolymers of ethylene and of vinyl alcohol. They originate from the hydrolysis of ethylene/vinyl acetate copolymers. As this hydrolysis can be incomplete, vinyl acetate units may remain.

Mention may be made, as examples of polyester, of PET (poly(ethylene terephthalate)), PBT (poly(butylene terephthalate)) or PEN (poly(ethylene naphthenate)).

The copolymers comprising polyester blocks and polyether blocks are copolymers having polyether units derived from polyetherdiols, such as polyethylene glycol (PEG), polypropylene glycol (PPG) or polytetramethylene glycol (PTMG), dicarboxylic acid units, such as terephthalic acid, and glycol (ethanediol) or 1,4-butanediol units. The linking of the polyethers and of the diacids forms flexible segments, whereas the linking of the glycol or of the butanediol with the diacids forms the rigid segments of the copolyetherester.

Such copolyetheresters are disclosed in Patents EP 402 883 and EP 405 227, the contents of which are incorporated in the present application.

Mention may be made, as thermoplastic polyurethanes, of polyetherurethanes, for example those comprising diisocyanate units, units derived from polyetherdiols and units derived from ethanediol or from 1,4-butanediol.

Mention may also be made of polyesterurethanes, for example those comprising diisocyanate units, units derived from amorphous polyesterdiols and units derived from ethanediol or from 1,4-butanediol.

The polyketones are polymers comprising substantially one mole of carbon monoxide per each mole of unsaturated monomer. This monomer can be chosen from α-olefins having 2 to 12 carbon atoms or their substitution derivatives. It can also be chosen from styrene or its derivatives obtained by substitution with alkyls, such as methylstyrenes, ethylstyrene and isopropylstyrene.

The polyketones are preferably copolymers of ethylene and of carbon monoxide or copolymers of ethylene, of propylene and of carbon monoxide.

When the polyketones are copolymers of ethylene, of a second monomer and of carbon monoxide, there are at least two ethylene units per one unit of the second monomer and preferably 10 to 100.

The polyketones can be represented by the formula:

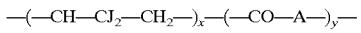

in which A denotes an unsaturated monomer having at least 3 carbon atoms, the x/y ratio being at least 2.

The —(—CO—CH$_2$—CH$_2$—) and —(—CO—A—)— units are randomly distributed in the polyketone chain.

The number-average molar masses can be between 1000 and 200,000, advantageously between 20,000 and 90,000 (measured by gel permeation chromatography). The melting temperatures can be between 175 and 300° C., generally between 200 and 270° C.

Syntheses of these polyketones are disclosed in U.S. Pat. Nos. 4,843,144, 4,880,903 and 3,694,412, the contents of which are incorporated in the present application.

It would not be departing from the scope of the present invention to use, for (M), a mixture of several thermoplastics.

As regards the rigid nodules, their size is advantageously less than 1 μm, that is to say that more than 50% by number are less than 1 μm. The shape of these nodules is preferably spherical.

The hard nodules of controlled morphology and controlled size are obtained by radical polymerization of (di-, tri-) unsaturated monomers (polymerizing by this route). Thus, during the polymerization, because of the multifunctionality of the monomer, there is formed a crosslinked network having the properties of a rigid material (insoluble, high Tg). Mention may be made, as examples of precursors, of the following monomers:

- trimethylolpropane triacrylate (TMPTA), trimethylolpropane trimethacrylate (TMPTMA), trimethylolpropane ethoxylate (di-, tri-) acrylates, trimethylolpropane diallyl ether, di(trimethylolpropane) tetraacrylate, pentaerythritol tetraacrylate, pentaerythritol triacrylate, ethoxylated trimethylolpropane triacrylate or ethoxylated pentaerythritol tetraacrylate.
- triallyl cyanurate, triallyl isocyanurate, triallylamine, triallyl 1,3,5-benzenetricarboxylate or tris[2-(acryloyloxy)ethyl]isocyanurate
- divinylbenzene, trivinylcyclohexane or divinyl sulphone, 1,3-divinyltetramethyldisiloxane
- diallyl monomers: diallyl carbonate, diallylmethylsilane, diallyl ether, diallyl maleate, diallyl phthalate, diallyl pyrocarbonate, diallyl succinate or diallylphenylphosphine.

A radical polymerization initiator is advantageously added, peroxides being perfectly suitable. Mention may be made, as examples of peroxide, of t-butyl hydroperoxide, cumene hydroperoxide, diisopropylbenzene hydroperoxide, di-t-butyl peroxide, t-butyl cumyl peroxide, dicumyl peroxide, 1,3-bis(t-butylperoxyisopropyl)benzene, acetyl peroxide, benzoyl peroxide, isobutyryl peroxide, bis(3,5,5-trimethylhexanoyl) peroxide and methyl ethyl ketone peroxide. The proportion of initiator is advantageously between 0 and 0.5% by weight of the amount of precursor.

The proportion of rigid nodules by weight is advantageously from 1 to 60 parts per 99 to 40 parts of thermoplastic (M).

Mention may be made, as examples of (S), of polyolefins, functionalized polyolefins, grafted aliphatic polyesters, optionally grafted polymers comprising polyether blocks and polyamide blocks, or copolymers of ethylene and of an alkyl (meth)acrylate and/or of a saturated carboxylic acid vinyl ester. Examples of polyolefins have already been mentioned in the description of (M).

(S) can also be a block copolymer having at least one block compatible with (M).

The functionalized polyolefin is a polymer comprising α-olefin units and epoxide or carboxylic acid or carboxylic acid anhydride units.

Mention may be made, as examples of (S), of the polyolefins mentioned in the polymers (M) or SBS, SIS or SEBS block polymers, EPR (ethylene-propylene rubber, also known as EPM) or EPDM, or these above polymers grafted with unsaturated epoxides, such as glycidyl (meth)acrylate, or with carboxylic acids, such as (meth)acrylic acid, or with unsaturated carboxylic acid anhydrides, such as maleic anhydride.

Mention may also be made of:

- copolymers of ethylene, of an unsaturated epoxide and optionally of an unsaturated carboxylic acid ester or salt or of a saturated carboxylic acid vinyl ester. These are, for example, ethylene/vinyl acetate/glycidyl (meth)acrylate copolymers or ethylene/alkyl (meth)acrylate/glycidyl (meth)acrylate copolymers.
- copolymers of ethylene, of an unsaturated carboxylic acid anhydride and/or of an unsaturated carboxylic acid which can be partially neutralized with a metal (Zn) or an alkali metal (Li), and optionally of an unsaturated carboxylic acid ester or of a saturated carboxylic acid vinyl ester. These are, for example, ethylene/vinyl acetate/maleic anhydride copolymers or ethylene/alkyl (meth)acrylate/maleic anhydride copolymers or ethylene/Zn or Li (meth)acrylate/maleic anhydride copolymers.
- polyethylene, polypropylene, or ethylene-propylene copolymers grafted or copolymerized with an unsaturated carboxylic acid anhydride and then condensed with a monoaminated polyamide (or polyamide oligomer). These products are disclosed in EP 342 066.

The functionalized polyolefin is advantageously chosen from ethylene/alkyl (meth)acrylate/maleic anhydride copolymers, ethylene/vinyl acetate/maleic anhydride copolymers, or ethylene-propylene copolymers, predominantly made of propylene, grafted with maleic anhydride and then condensed with monoaminated polyamide-6 or monoaminated oligomers of caprolactam.

This is advantageously an ethylenelalkyl (meth)acrylate/maleic anhydride copolymer comprising up to 40% by weight of alkyl (meth)acrylate and up to 10% by weight of maleic anhydride. The alkyl (meth)acrylate can be chosen from methyl acrylate, ethyl acrylate, n-butyl acrylate, isobutyl acrylate, 2-ethylhexyl acrylate, cyclohexyl acrylate, methyl methacrylate and ethyl methacrylate.

Mention may be made, as grafted aliphatic polyesters, of polycaprolactone grafted with maleic anhydride, glycidyl methacrylate, vinyl esters or styrene. These products are disclosed in Patent Application EP 711 791.

The polymers comprising polyamide blocks and polyether blocks have been described above in the polymers (M). These products can be grafted with vinyl chloride or alkyl acrylates. These products are disclosed in Patent EP 365 398.

Mention may also be made, as examples of (S), of elastomers, such as polybutadiene, SBR (styrene-butadiene rubber), NBR (nitrile-butadiene rubber), polyisoprene, these functionalized elastomers or epichlorohydrin rubber.

It would not be departing from the scope of the invention to use several impact modifiers and/or to use, for example, a mixture of a functionalized impact modifier and of another non-functionalized impact modifier.

The proportion of impact modifier can be from 0 to 60 parts (by weight) per 100 to 40 parts of (M).

Advantageous compositions comprise (by weight, the total being 100):

40 to 99 parts of (M), 1 to 60 parts of rigid nodules, 0 to 60 parts of impact modifier.

The compositions according to the invention can, in addition, comprise at least one additive chosen from:

dyes;

pigments;

optical brighteners;

antioxidants;

UV stabilizers.

Another aspect of the present invention also relates to a process for the preparation of these compositions. It consists, in a first stage, in forming a homogeneous solution of precursor of the nodules in the thermoplastic (M) in the molten state, in a second stage, in introducing the initiator while remaining at a temperature below which the initiator becomes active, and, in a third stage, in heating to a temperature sufficient to cause crosslinking of the precursor and to form rigid nodules while kneading the composition, the impact modifier being introduced during the first or the second stage.

The first stage of the process consists in choosing the thermoplastic matrix (or thermoplastic matrix mixture)/ precursor pair using phase diagrams drawn up beforehand as a function of the temperature. This first stage makes it possible to define the temperature range within which the starting mixture will be homogeneous. There is then an effect of plasticization of the thermoplastic matrix.

After having introduced the thermoplastic matrix/ precursor relative proportions, the second stage consists in introducing the radical polymerization initiator into the homogeneous reaction mixture. When all the initiator has been introduced, the ternary system is brought to the desired temperature (reaction temperature related to the nature of the initiator) in order to give rise to the crosslinking reaction of the precursor.

The third and final stage is carried out during the crosslinking reaction, where there is, depending on the degree of progression of the crosslinking, phase separation resulting in the formation of rigid nodules within a thermoplastic matrix.

This same procedure is also applicable for systems such as thermoplastics/impact modifier/precursor/initiator mixtures. Advantageously, during a first stage, the elastomer/ precursor homogeneous binary mixture is prepared, then this mixture is subsequently incorporated in the thermoplastic matrix in the presence of the initiator, in order to result in the final crosslinking stage and then phase separation.

The temperature of the first stage depends on the melting or glass transition temperature of the thermoplastic (M) in the presence of the precursor. The pressure has no influence. It is possible to operate in open kneaders or in single-screw or twin-screw extruders or any device used in the compounding of thermoplastics.

The temperatures of the second and third stages are determined by the crosslinking temperature of the precursor, it being possible for this crosslinking stage to be carried out in the presence or in the absence of initiator (simply by thermal initiation of the precursor). In the presence of initiators, the crosslinking temperature is the temperature at which the initiators generate free radicals.

The duration of the third stage can be from 1 second to 4 hours. It can be carried out in 1 to 5 or 10 minutes and this is one of the main advantages of the invention. In reality, this duration is easily determined by a person skilled in the art of the processing of thermoplastics. The throughput of a machine, such as an extruder, the heating conditions, the temperature at which the possible initiator gives radicals or the temperature at which the precursor thermally crosslinks are known.

EXAMPLES

Example 1

Syntheses of Binary Mixtures of PMMA and of Rigid Nodules Based on Trifunctional Acrylate Monomers with Different Levels of Rigid Phase Sample 1-1: 100% PMMA processed under the same conditions, for reference.

55 g of PMMA (Altuglas® GR5) are introduced into the reactor of a Brabender kneader. The temperature is brought to 160° C. for 10 min. The PMMA subsequently exits from the reactor and is shaped as 80×10×4 bars in order to carry out the Vicat 50N temperature measurements.

Sample 1-2: 90% PMMA, 9.95% TMPTMA and 0.05% dicumyl peroxide (% by mass).

49.5 g of PMMA (Altuglas® GR5) are introduced into the reactor of a Brabender kneader. The temperature is brought to 160° C. for 10 min. The 9.95% of TMPTMA are subsequently added portionwise. The temperature of the chamber of the kneader is gradually brought down to 100° C. as TMPTMA is added. At the final addition of the TMPTMA, the 0.05% of dicumyl peroxide is also added. The temperature is subsequently brought to 160° C., in order to carry out the crosslinking of the TMPTMA, for 10 minutes. The mixture exits from the reactor and is shaped as 80×10×4 bars in order to carry out the Vicat 50N temperature measurements.

Sample 1-3: 80% PMMA, 19.8% TMPTMA and 0.2% dicumyl peroxide (% by mass).

43.56 g of PMMA (Altuglas® GR5) are introduced into the reactor of a Brabender kneader. The temperature is brought to 160° C. for 10 min. The 19.8% of TMPTMA are subsequently added portionwise. The temperature of the chamber of the kneader is gradually brought down to a temperature of 100° C. as the TMPTMA is added. At the final addition of TMPTMA, the 0.2% of dicumyl peroxide is added. The temperature is subsequently brought to 160° C., in order to carry out the crosslinking of the TMPTMA, for 10 minutes. The mixture exits from the reactor and is shaped as 80×10×4 bars in order to carry out the Vicat 50N temperature measurements.

Sample 1-4: 70% PMMA, 29.55% TMPTMA and 0.45% dicumyl peroxide (% by mass).

37.9 g of PMMA (Altuglas® GR5) are introduced into the reactor of a Brabender kneader. The temperature is brought to 160° C. for 10 min. The 29.55% of TMPTMA are subsequently added portionwise. The temperature of the chamber of the kneader is gradually brought down to a temperature of 100° C. as the TMPTMA is added. At the final addition of TMPTMA, the 0.45% of dicumyl peroxide is added. The temperature is subsequently brought to 160° C., in order to carry out the crosslinking of the TMPTMA for 10 minutes. The mixture exits from the reactor and is shaped as 80×10×4 bars in order to carry out the Vicat 50N temperature measurements.

The results of the Vicat temperatures of Samples 1-1 to 1-4 are given in the table below.

| SAMPLES | VICAT 50N (ISO 306B50) |
| --- | --- |
| 1-1 | 86.1 (+/−0.5) |
| 1-2 | 89.2 (+/−0.4) |
| 1-3 | 93.3 (+/−0.8) |
| 1-4 | 97.5 (+/−1.1) |

Example 2

Syntheses of Binary Mixtures of PVDF and of Rigid Nodules Based on Trifunctional Acrylate Monomers with Different Levels of Rigid Phase Sample 2-1: 100% PVDF processed under the same conditions, for reference.

55 g of PVDF (Kynar® 1000 LD from Elf Atochem) are introduced into the reactor of a Brabender kneader. The temperature is brought to 210–220° C. for 10 min. The PVDF subsequently exits from the reactor and is shaped as 80×10×4 bars in order to carry out the Vicat 50N temperature measurements.

Sample 2-2: 87.5% PVDF, 12.44% TMPTA and 0.06% 2,5-dimethyl-2,5-bis(tert-butylperoxy)hexane (DBPH) (% by mass).

49.5 g of PVDF (Kynar® 1000 LD) are introduced into the reactor of a Brabender kneader. The temperature is brought to 21° C. for 10 min. The 12.44% of TMPTA are subsequently added portionwise. The temperature of the chamber of the kneader is gradually brought down to a temperature of 130–140° C. as the TMPTA is added. At the final addition of TMPTA, 0.06% of DBPH is added. The temperature is subsequently brought to 180° C., in order to carry out the crosslinking of the TMPTA, for 10 minutes. The mixture exits from the reactor and is shaped as 80×10×4 bars in order to carry out the Vicat 50N temperature measurements.

Sample 2-3: 75% PVDF, 24.75% TMPTA and 0.25% 2,5-dimethyl-2,5-bis(tert-butylperoxy)hexane (DBPH) (% by mass).

42 g of PVDF (Kynar® 1000 LD) are introduced into the reactor of a Brabender kneader. The temperature is brought to 210° C. for 10 min. The 24.75% of TMPTA are subsequently added portionwise. The temperature of the chamber of the kneader is gradually brought down to a temperature of 130–140° C. as the TMPTA is added. At the final addition of TMPTA, the 0.25% of DBPH is added. The temperature is subsequently brought to 180° C., in order to carry out the crosslinking of the TMPTA, for 10 minutes. The mixture exits from the reactor and is shaped as 80×10×4 bars in order to carry out the Vicat 50N temperature measurements.

The results of the Vicat temperatures of Samples 2-1 to 2-3 are given in the following table.

| SAMPLES | VICAT 50N (ISO 306B50) |
| --- | --- |
| 2-1 | 129 (+/−1.4) |
| 2-2 | 142 (+/−0.4) |
| 2-3 | 160 (+/−0.2) |

Example 3

Syntheses of Mixtures of PA-12, of Impact Modifier and of Rigid Nodules Based on Trifunctional Acrylate Monomers with Different Levels of Rigid Phase The impact modifier is Lotader 4700®, an ethylene-butyl acrylate-maleic anhydride copolymer with an MFI (melt flow index in g per 10 min) of 7 (at 190° C., 2.16 kg) comprising 30% of acrylate and 1.5% of anhydride.

PA-12 denotes a polyamide-12 with an intrinsic viscosity of 1.65.

Sample 3-1: 100% PA-12 (Aesno® TL) processed under the same conditions, for reference.

55 g of PA-12 (Aesno® TL) are introduced into the reactor of a Brabender kneader. The temperature is brought to 190° C. for 10 min. The PA-12 subsequently exits from the reactor and is shaped as 80×10×4 bars in order to carry out the mechanical characterizations (impact, modulus and Vicat 50N).

Sample 3-2: Preparation of the binary mixture of Lotader® and of TMPTA (60/40: % by mass) without carrying out the crosslinking of the TMPTA.

40 g of Lotader® 4700 are introduced into the reactor of a Brabender kneader. The temperature is brought to 110° C. for 10 min. The 40% of TMPTA are subsequently added portionwise. The temperature of the chamber of the kneader is maintained at 110° C. until the addition of the TMPTA has been completed.

Sample 3-3: 85% PA-12, 14.925% Sample 3-2 and 0.075% 2,5-dimethyl-2,5-bis(tert-butylperoxy)hexane (DBPH) (% by mass).

47 g of PA-12 (Aesno® TL) are introduced into the reactor of a Brabender kneader. The temperature is brought to 190° C. for 10 min. The 14.925% of Sample 3-2 are subsequently added. After all the Sample 3-2 has been added, the 0.075% of DBPH is added and the temperature of the chamber of the kneader is quickly increased to a temperature of 220° C. and is kept constant for 10 minutes. The mixture exits from the reactor and is shaped as 80×10×4 bars in order to carry out the mechanical characterizations (impact, modulus and Vicat 50N).

Sample 3-4: 85% PA-12 and 15% Lotader® 4700 (% by mass): serves as reference.

47 g of PA-12 (Aesno® TL) are introduced into the reactor of a Brabender kneader. The temperature is brought to 190° C. for 10 min. The 15% of Lotader® 4700 are subsequently added. After all the Lotader® has been added, the temperature of the chamber of the kneader is quickly increased to a temperature of 220° C. and is kept constant for 10 minutes. The mixture exits from the reactor and is shaped as 80×10×4 bars in order to carry out the mechanical characterizations (impact, modulus and Vicat 50N).

The main mechanical properties of these alloys are summarized in the following table.

| Samples | Notched Charpy impact in kJ/m² | Flexural modulus in MPa | Vicat in ° C. |
|---|---|---|---|
| 3-1 | 10.2 | 1100 | 140 |
| 3-3 | 60 | 1450 | 144 |
| 3-4 | 45 | 777 | 100 |

Example 4

Syntheses of mixtures of PA-12, of impact modifier and of rigid nodules based on trifunctional acrylate monomers with different levels of rigid phase. The impact modifier is a copolymer comprising polyamide-12 blocks and polytetramethylene glycol blocks (1000/1000) with a Shore D hardness of 40, denoted by Pebax® MX 1205.

Sample 4-1: 100% PA-12 (Aesno® TL) processed under the same conditions, for reference.

55 g of PA-12 (Aesno® TL) are introduced into the reactor of a Brabender kneader. The temperature is brought to 190° C. for 10 min. The PA-12 subsequently exits from the reactor and is shaped as 80×10×4 bars in order to carry out the mechanical characterizations (impact, modulus and Vicat 50N).

Sample 4-2: Preparation of the binary mixture of Pebax® MX 1205 and of TMPTA (60/40: % by mass) without carrying out the crosslinking of the TMPTA.

40 g of Pebax® are introduced into the reactor of a Brabender kneader. The temperature is brought to 165° C. for 10 min. The 40% of TMPTA are subsequently added portionwise. The temperature of the chamber of the kneader is maintained at 165° C. until the addition of the TMPTA has been completed.

Sample 4-3: 85% PA-12, 14.925% Sample 4-2 and 0.075% 2,5-dimethyl-2,5-bis(tert-butylperoxy)hexane (DBPH) (% by mass).

47 g of PA-12 (Aesno® TL) are introduced into the reactor of a Brabender kneader. The temperature is brought to 190° C. for 10 min. The 14.925% of Sample 4-2 are subsequently added. After all the Sample 3-2 has been added, the 0.075% of DBPH are added and the temperature of the chamber of the kneader is quickly increased to a temperature of 220° C. and is kept constant for 10 minutes. The mixture exits from the reactor and is shaped as 80×10×4 bars in order to carry out the mechanical characterizations (impact, modulus and Vicat 50N).

Sample 4-4: 85% PA-12 and 15% Pebax® (% by mass): serves as reference.

47 g of PA-12 (Aesno® TL) are introduced into the reactor of a Brabender kneader. The temperature is brought to 190° C. for 10 min. The 15% of Pebax® are subsequently added. After all the Pebax® has been added, the temperature of the chamber of the kneader is quickly increased to a temperature of 220° C. and is kept constant for 10 minutes. The mixture exits from the reactor and is shaped as 80×10×4 bars in order to carry out the mechanical characterizations (impact, modulus and Vicat 50N).

The main mechanical properties of these alloys are summarized in the following table.

| Samples | Notched Charpy impact in kJ/m² | Flexural modulus in MPa | VICAT in ° C. |
|---|---|---|---|
| 4-1 | 10.2 | 1100 | 140 |
| 4-3 | 75 | 1400 | 143 |
| 4-4 | 55 | 900 | 113 |

The preceding examples can be repeated with similar success by substituting the generically or specifically described reactants and/or operating conditions of this invention for those used in the preceding examples. Also, the preceding specific embodiments are to be construed as merely illustrative, and not limitative of the remainder of the disclosure in any way whatsoever.

The entire disclosure of all applications, patents and publications, cited above, and of corresponding French application 99/04722, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

Where the word "consists" is used in the preceding specification, it is used in the sense of "comprising" and the latter term is used in the following claims.

What is claimed is:

1. A composition comprising:
   (a) a matrix-forming thermoplastic polymer (M),
   (b) rigid cross-linked nodules obtained by radical polymerization in which 50% by number of the nodules have a size of less than 1 µm incorporated in said matrix; and
   (c) an impact modifier (S),
   said composition having been prepared by a process comprising forming a homogeneous solution of a precursor of the rigid cross-linked nodules in the matrix-forming thermoplastic in the molten state, said composition, after being formed into an article, providing enhanced thermomechanical properties to said matrix-forming thermoplastic polymer.

2. A composition according to claim 1, in which the thermoplastic polymer (M) is selected from the group consisting of polyolefins, polyamides, fluorinated polymers, saturated polyesters, polycarbonate, styrene resins, polymethyl methacrylate (PMMA), thermoplastic polyurethanes (TPU), copolymers comprising polyamide blocks, copolymers comprising polyester blocks and polyether blocks, polyvinyl chloride (PVC), copolymers of ethylene and of vinyl alcohol (EVOH), and polyketones.

3. A composition according to claim 2, in which the proportions are as follows based on a total of 100 parts by weight of (a), (b) and (c):
   (a) 40 to 99 parts of (M),
   (b) 1 to 60 parts of rigid nodules, and
   (c) more than 0 to 60 parts of impact modifier.

4. A composition according to claim 2, wherein the precursor of the crosslinked rigid nodules is selected from the group consisting of:
   trimethylolpropane triacrylate (TMPTA), trimethylolpropane trimethacrylate (TMPTMA), trimethylolpropane ethoxylate (di-, tri-) acrylates, trimethylolpropane diallyl ether, di(trimethylolpropane) tetraacrylate, pentaerythritol tetraacrylate, pentaerythritol triacrylate, ethoxylated trimethylolpropane triacrylate or ethoxylated pentaerythritol tetraacrylate, triallyl cyanurate, triallyl isocyanurate, triallylamine, triallyl 1,3,5-benzenetricarboxylic or tris[2-(acryloyloxy) ethyl]isocyanurate, divinylbenzene, trivinylcyclohexane or divinyl sulphone, 1,3-divinyltetramethyldisiloxane, diallyl carbonate, diallylmethylsilane, diallyl ether, diallyl maleate, diallyl phthalate, diallyl pyrocarbonate, diallyl succinate or diallyphenylphosphine.

5. A composition according to claim 4, in which 50% by number of the nodules have a size of less than 1 μm.

6. A composition according to claim 5, in which the proportion of rigid nodules by weight is from 1 to 60 parts per 99 to 40 parts of thermoplastic (M).

7. A composition according to claim 1, in which the proportion of rigid nodules by weight is from 1 to 60 parts per 99 to 40 parts of thermoplastic (M).

8. A composition according to claim 1, in which the precursor of the cross-linked rigid nodules is trimethylolpropane triacrylate (TMPTA) or trimethylolpropane trimethacrylate (TMPTMA).

9. A composition according to claim 8, wherein (a) is PMMA, polyvinyl difluoride or PA-12.

10. A composition according to claim 9, containing an impact modifier.

11. A process for the preparation of a composition according to claim 1, comprising, in a first stage, forming a homogeneous solution of precursor of the nodules in the thermoplastic (M) in the molten state, in a second stage, introducing an initiator while remaining at a temperature below which the initiator becomes active, and, in a third stage, heating to a temperature sufficient to cause crosslinking of the precursor and to form rigid nodules while kneading the composition, the impact modifier being introduced during the first or the second stage.

12. A process according to claim 11, in which the initiator is a peroxide in a proportion of more than 0 to 0.5% by weight of the amount of precursor.

13. A composition according to claim 1, in which the precursor of the cross-linked rigid nodules is trimethylolpropane triacrylate (TMPTA) or trimethylolpropane trimethacrylate (TMPTMA).

14. A composition according to claim 13, wherein the nodules are spherical.

15. A composition according to claim 1, in which the proportion of impact modifier is from above 0 to 60 parts per 100 to 40 parts of (M).

16. A composition according to claim 1, wherein the nodules are spherical.

17. A composition according to claim 1, wherein the precursor of the crosslinked rigid nodules is selected from the group consisting of:

trimethylolpropane triacrylate (TMPTA), trimethylolpropane trimethacrylate (TMPTMA), trimethylolpropane ethoxylate (di-, tri-) acrylates, trimethylolpropane diallyl ether, di(trimethylolpropane) tetraacrylate, pentaerythritol tetraacrylate, pentaerythritol triacrylate, ethoxylated trimethylolpropane triacrylate or ethoxylated pentaerythritol tetraacrylate, triallyl cyanurate, triallyl isocyanurate, triallylamine, triallyl 1,3,5-benzenetricarboxylic or tris[2-(acryloyloxy) ethyl]isocyanurate, divinylbenzene, trivinylcyclohexane or divinyl sulphone, 1,3-divinyltetramethyldisiloxane, and diallyl carbonate, diallylmethylsilane, diallyl ether, diallyl maleate, diallyl phthalate, diallyl pyrocarbonate, diallyl succinate or diallyphenylphosphine.

18. A composition according to claim 1, wherein (a) the matrix forming thermoplastic polymer (M) is polyrnethylmethacrylate, and (b) the rigid cross-linked nodules are obtained by radical polymerization of precursor trimethylolpropane triacrylate (TMPTA).

19. A composition according to claim 1, wherein (a) the matrix-forming thermoplastic polymer (M) is polymethylmethacrylate, polyvinylidene difluoride or a polyamide, and (b) the rigid cross-linked nodules are obtained by radical polymerization of precursor trimethylolpropane triacrylate (TMPTA).

20. A thermoplastic composition according to claim 1, produced by a process comprising, in a first stage, forming a homogeneous solution of precursor of the nodules in the thermoplastic (M) in the molten state, in a second stage, introducing the initiator while remaining at a temperature below which the initiator becomes active, and, in a third stage, heating to a temperature sufficient to cause crosslinking of the precursor and to form rigid nodules while kneading the composition.

21. A composition according to claim 1, wherein the matrix-forming thermoplastic polymer (M) is polymethyl methacrylate and the rigid cross-linked nodules are obtained by radical polymerization of precursor trimethylolpropane triacrylate (TMPTA), or trimethylolpropane trimethacrylate (TMPTMA), and the impact modifier is an ethylene-butyl acrylate-maleic anhydride copolymer, or a copolymer comprising polyamide-12 blocks and polytetramethylene glycol blocks, or a mixture thereof.

22. A composition according to claim 1, wherein the impact modifier is selected from the group consisting of an ethylene-propylene rubber and an ethylene-alkyl acrylate-maleic anhydride copolymer said impact modifier being present in amounts which would lead to a decrease in the Vicat point and/or in the deflection temperature, in the absence of said rigid cross-linked modules, of an article formed from said composition.

23. A composition according to claim 1 wherein the impact modifier is selected from the group consisting of non-functionalized polyolefins, functionalized polyolefins, grafted aliphatic polyesters, optionally grafted polymers comprising polyether blocks and polyamide blocks, and a copolymer of ethylene and at least one of an alkyl(meth) acrylate and a saturated carboxylic acid vinyl ester.

24. A composition according to claim 1, wherein the impact modifier is an ethylene-butyl acrylate-maleic anhydride copolymer, or a copolymer comprising polyamide-12 blocks and polytetramethylene glycol blocks, or a mixture thereof.

* * * * *